United States Patent [19]

Zernig et al.

[11] 4,120,598

[45] Oct. 17, 1978

[54] ASSEMBLY FIXTURE FOR FURNITURE

[75] Inventors: Ernst Zernig, Hemer; Manfred Rüther, Nachrodt, both of Fed. Rep. of Germany

[73] Assignee: Firma Richard Heinze GmbH & Co. KG, Herford, Fed. Rep. of Germany

[21] Appl. No.: 722,959

[22] Filed: Sep. 13, 1976

[30] Foreign Application Priority Data

Sep. 18, 1975 [DE] Fed. Rep. of Germany ....... 2541554

[51] Int. Cl.² ............................................. F16B 12/50
[52] U.S. Cl. .................................... 403/68; 312/263; 312/326; 403/19; 403/174; 52/204; 52/285; 49/397; 16/129
[58] Field of Search ................. 403/405, 407; 52/127, 52/578, 582; 312/263, 140; 108/152

[56] References Cited

U.S. PATENT DOCUMENTS

| 747,683 | 12/1903 | Clark | 403/407 |
| 791,523 | 6/1905 | Williams | 403/407 |
| 793,255 | 6/1905 | Williams | 403/407 |
| 3,347,574 | 10/1967 | Strubin | 403/407 |
| 3,862,809 | 1/1975 | Bodner | 403/407 |

*Primary Examiner*—Casmir A. Nunberg
*Attorney, Agent, or Firm*—Pollock, Vande Sande and Priddy

[57] ABSTRACT

A furniture assembly fixture having a first fixture section comprising a casing adapted to be embedded in a first furniture part, a second fixture section adapted to be fastened to a second furniture part, the casing having a flange with a lug or lugs, the flange also carrying an adjusting plate for a furniture hinge.

14 Claims, 19 Drawing Figures

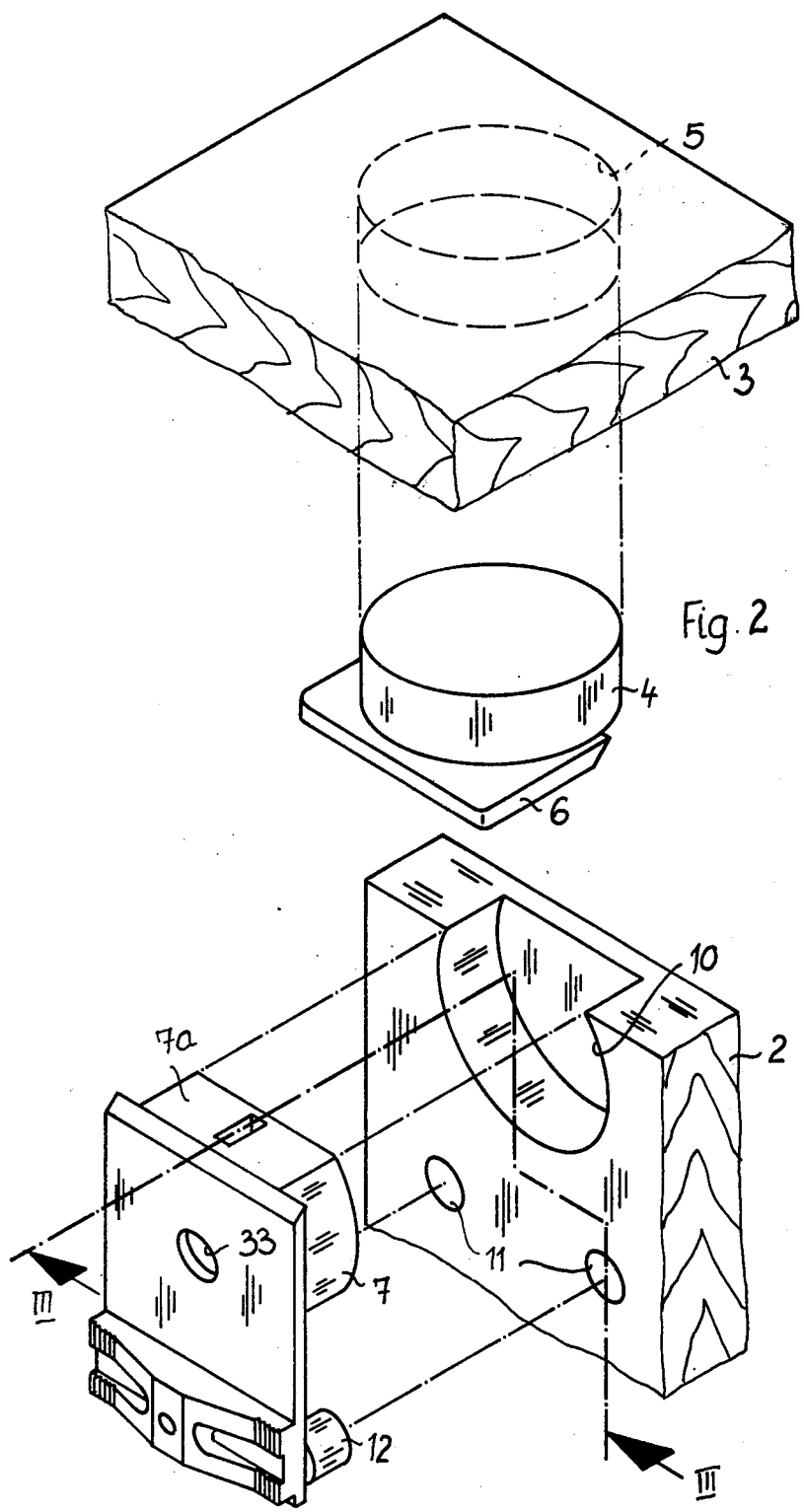

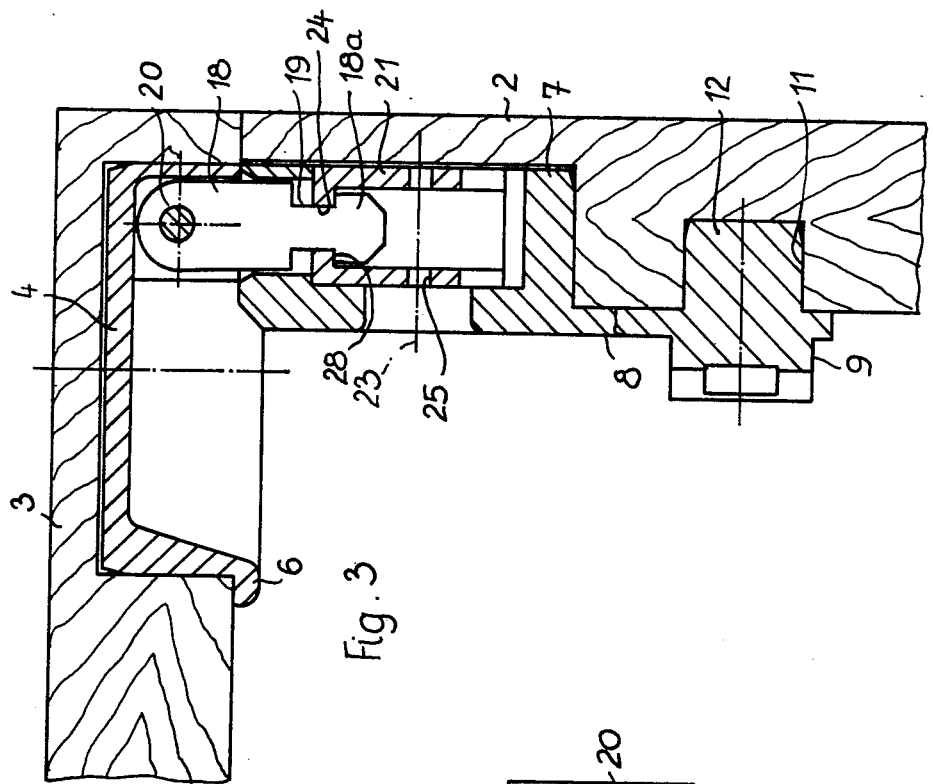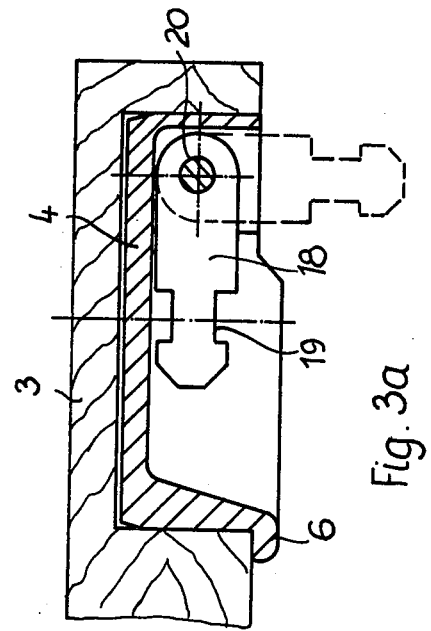

ASSEMBLY FIXTURE FOR FURNITURE

The present invention relates to an assembly fixture for furniture, of the type comprising a first fixture section containing a casing that can be embedded in an associated first furniture part, a second fixture that can be fastened within an associated second furniture part, and a flange with a lug or lugs which is located and formed to the casing to be embedded.

An assembly fixture of the foregoing general type is known (See German Gebrauchsmuster No. 7,142,379) where, within a pot-shaped casing, is arranged a turning eccentric worm that interacts with a connecting rod and that clamps the two furniture parts together during the turning motion. Another somewhat similar assembly fixture is shown in German Gebrauchsmuster No. 6,948,091, but the bolt, fastened within the second furniture part, is only inserted in a corresponding recess arranged in the casing within the first fixture section. This latter assembly fixture is utilized in practice only as a support for drawer bottoms.

Assembly fixtures for the foregoing type are used primarily for furniture that can be sectionized. The doors of such furniture sections are usually hinged to the side walls of the furniture by means of standard hinges. So-called adjusting plates, which are clasped by the hinge bracket, are fastened to the side walls. So-called dowel pins, which are driven into corresponding receiving bores in the side walls, are located at the adjusting plates. The bores accommodating the dowel pins must be accurately placed and dimensioned. The simultaneous use of furniture connectors and furniture hinges with their adjusting plates requires first a very precise construction, and requires secondly the assembly of a large number of separate, individual parts.

It is accordingly a primary object of the present invention to design an assembly fixture of the above-discussed type which is arranged in a manner that will simplify the manufacture as well as the assembly of prefabricated furniture. This object is achieved in accordance with the present invention by the provision of a flange which carries an adjusting plate for a furniture hinge. The placement of an adjusting plate of the flange of the embedded casing has the advantage that the formation of the bores in the furniture for the reception of the various sections of the assembly fixture and of the associated furniture hinge can be accomplished in a more simple manner and by means of less costly tools. Furthermore, the installation of an assembly fixture combined with an adjusting plate is far less difficult that the installation of separate fixture components.

In a further development of the invention, the second fixture section can also be provided with a casing that can be embedded in an associated furniture part. Such design of the assembly fixture allows the imposition of great forces from one furniture part to the other furniture part by way of the assembly fixture, resulting in a very stable connection between the furniture parts.

It is further proposed that there be placed within an embedded casing a swivel-mounted connecting rod, designed in such manner that it can enter a recess of the casing. Such a swivel-mounted connecting rod offers the advantage that it need not protrude during shipping thereby avoiding damage to the furniture parts. At the time of assembly the connecting rod is swung out and inserted in its counter part of the furniture assembly fixture.

According to another embodiment of the invention, the adjusting plate and the flange can be formed to provide a mating joint with each other. This coupling by shape can be arranged in such manner that the adjusting plate is prevented from sliding relative to the flange. If the parts are coupled by shape, and corresponding projections and recesses are arranged for the flange and the adjusting plate, it becomes possible to hold these parts together solely by use of weak set screws, because the forces are introduced to the flange by way of the mating joint. Such a design makes further possible the interchange of the adjusting plates so that adjusting plates of proper thickness can be employed as required in each given case.

According to another aspect of the invention, it is possible to provide the flange with a track for guiding the adjusting plate instead of holding the plate at one specific point. A dovetail track is the preferred form of such a guiding arrangement. The provision of a guiding track has the advantage that minor differences in height can be compensated for by sliding the adjusting plate along the dovetail track.

Finally, it is proposed by the invention that the fastening of the adjusting plate be accomplished by a screw which passes through an oblong hole within the adjusting plate and which serves simultaneously to spread apart a dowel pin located behind the flange.

The foregoing objects, advantages, construction, and operation will become more readily apparent from the subsequent description of preferred species of the invention shown in the drawings, wherein:

FIG. 2 is a perspective exploded view similar to FIG. 1, but without the door and hinge;

FIG. 3 is a section taken along plane III—III of FIG. 2, with the fully assembled fixture and furniture parts clamped together;

FIG. 3a illustrates one of the two assembly fixtures shown in FIG. 3 together with an inwardly swiveling connecting rod;

FIG. 11a is a top view of the structure of FIG. 11, as viewed in the direction of the arrow XIa in FIG. 11;

FIG. 12a is a sectional view along line XIIa—XIIa of FIG. 12;

Figure 1:
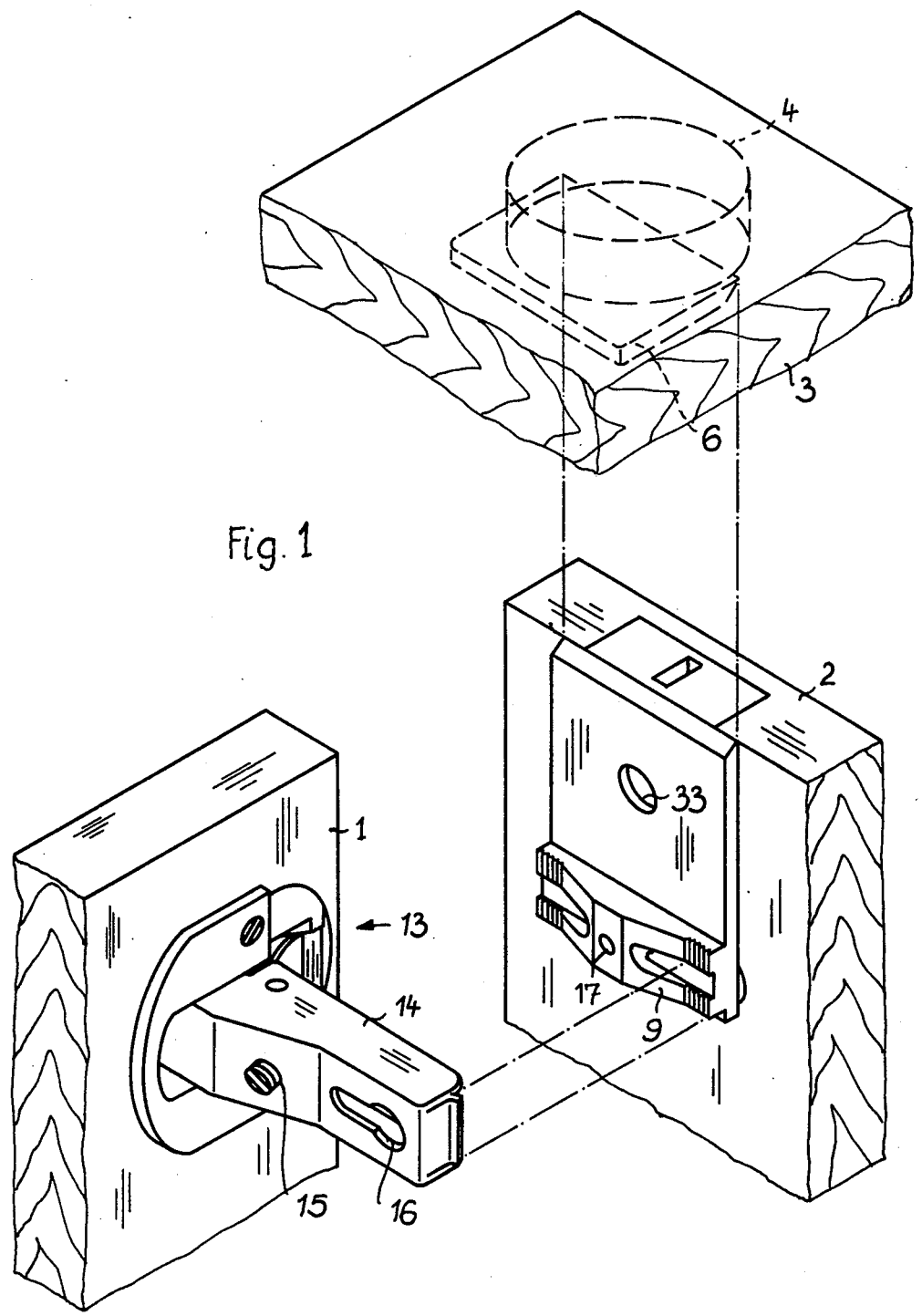
FIG. 1 is a perspective exploded view of portions of a furniture door, a furniture side wall and an upper furniture part, and the associated furniture assembly fixture and hinge.
Figure 4:
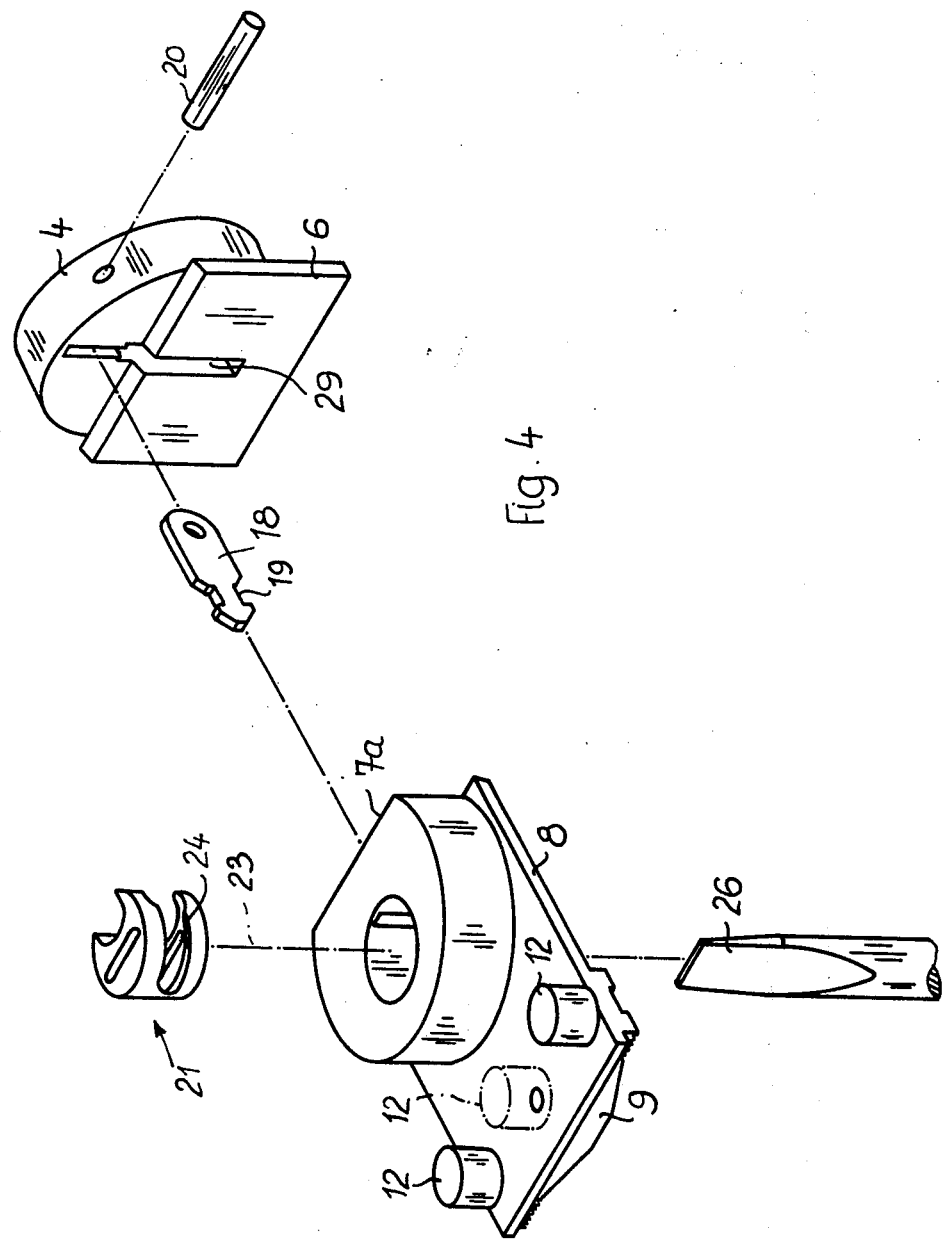
FIG. 4 is a perspective exploded view of the furniture assembly fixture as used in FIGS. 1 to 3.

FIGS. 1 to 4 of the drawings illustrate a first species of the invention. A door 1 is fastened to a furniture side wall 2 by means of a standard, general-purpose pot hinge 13. The hinge 13 includes a hinge bracket 14 which is mounted for pivotal motion about a vertical axis located within hinge 13 adjacent door 1, and said hinge bracket 14 extends outwardly from said vertical pivot axis for attachment to side wall 2 thereby to support door 1 for pivotal motion on and relative to side wall 2. The hinge bracket 14 overlaps an adjusting plate 9 that is located on the flange 8 of a housing 7, with the housing 7 being embedded in a bore 10 of the furniture side wall 2. The hinge bracket 14 has a U-shaped cross section facing adjusting plate 9, and said bracket 14 is so sized and shaped that bracket 14 is adapted to overlie and cover plate 9. The bracket 14 is provided with a projection at its free end which is adapted to engage a selected one of the plural vertical serrations shown in FIG. 1 at the right-hand end of plate 9. By varying the serration which is engaged by said projection, the position of hinge bracket 14 can be adjusted longitudinally relative to plate 9, whereafter the hinge bracket 14 can be fixed in its adjusted position by means of a fastening screw (not shown) which is extended through keyhole opening 16 in the hinge bracket 14 and into the bore 17 in adjusting plate 9. The door is aligned by means of the adjusting screw 15.

A casing 4, having a flange 6 (see FIG. 3), is inserted in a casing bore 5 provided in the upper furniture wall 3 and cooperates with housing 7 to fasten side wall 2 to upper wall 3 as will be described subsequently.

The housing 7 has basically a cylindrical shape with a flattened upper side 7a, and said housing 7 is placed within the bore 10 which is located in the furniture side wall 2. In contrast to prior art practice, where a hinge adjusting plate, when used, is a separate element which must be separately mounted on the side wall, the adjusting plate 9 in the present invention is formed onto the flange 8 (see FIG. 3) so that the mounting of housing 7 and its flange 8 simultaneously mounts and properly positions the adjusting plate 9 on side wall 2. At the rear of the flange 8 there are located two pegs 12 (FIG. 2) which fit into corresponding bores 11 in the furniture side wall for positioning flange 8 and its associated adjusting plate 9.

Walls 2 and 3 are fastened to one another through a connecting rod 18 (FIG. 3) which is swivel-mounted on a pin 20 that is fixedly arranged relative to the casing 4. The connecting rod 18 can swivel between two extreme positions, shown in FIG. 3a. The connecting rod 18 has a notched neck 19 which protrudes through a slot 24 of a worm eccentric 21. The worm eccentric 21 can pivot in a bore 22 of the housing 7 about an axis of rotation 23. This turning is accomplished by inserting a screwdriver 26 (FIG. 4) into a slot 25 (FIG. 3). The connecting rod 18 rests with its widened part 18a at the worm 28 of the worm eccentric 21. The contour of the worm 28 has a gradually decreasing distance from the axis of rotation 23. A turning of the worm eccentric will cause a pulling of the connecting rod 18 in the direction of the axis of rotation 23. As a result thereof, the upper furniture wall 3 will be forced at the same time against the furniture side wall 2. The connecting rod 18 protrudes through a broached hole 27 in the housing 7 into the interior of the worm eccentric 21. The connecting rod can disappear in a slot-shaped recess 29 (see FIG. 4), and can be swiveled for the purpose of assembly from its lowered position shown by heavy lines to a position shown by broken lines (FIG. 3a).

Figure 5:
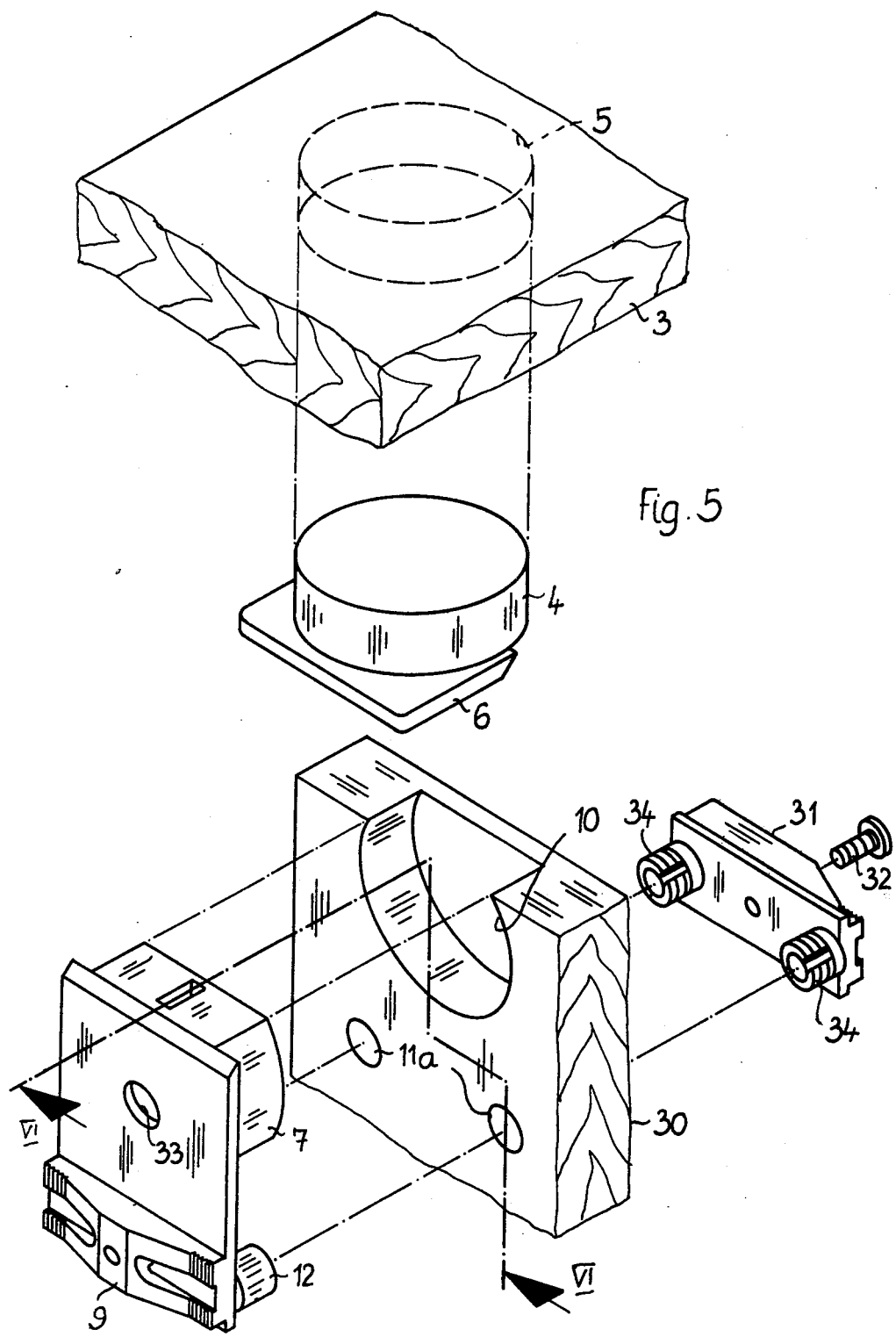
FIG. 5 is a perspective exploded view of another embodiment of the assembly fixture to be installed at a center wall of a piece of furniture.
Figure 6:
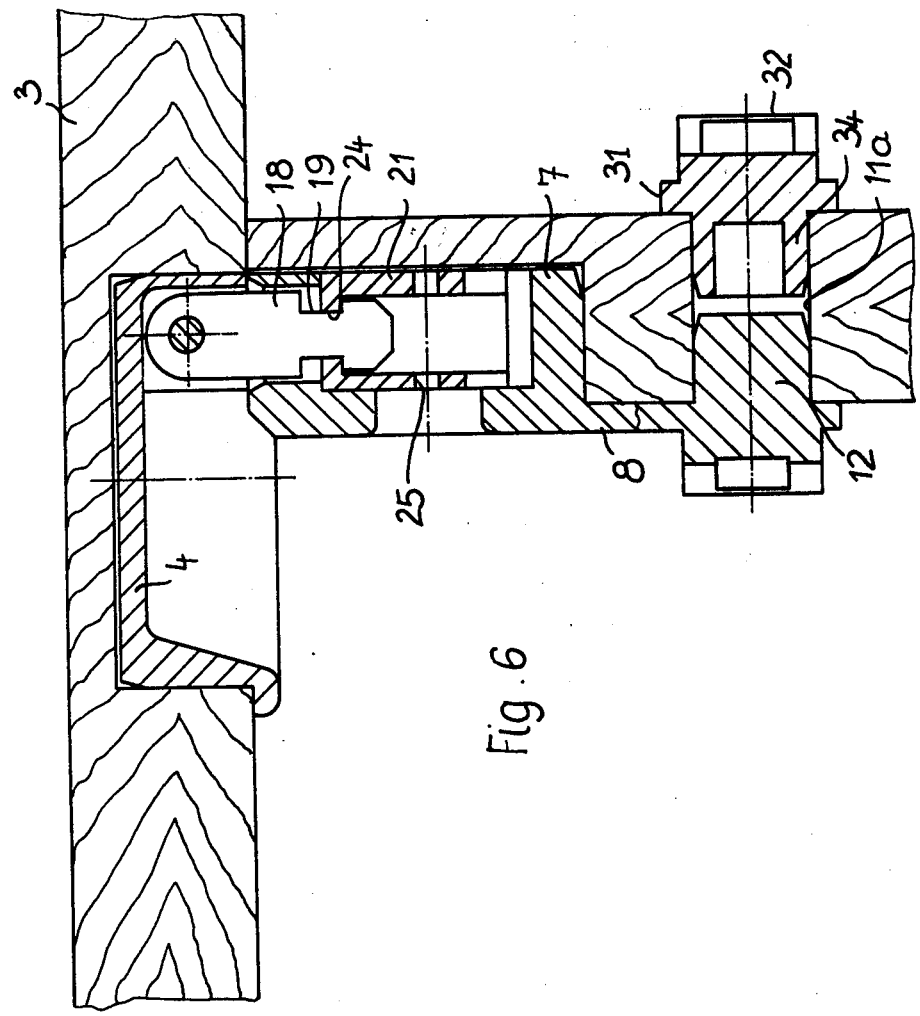
FIG. 6 is a sectional view through the fitted parts of FIG. 5, taken along line VI—VI of FIG. 5.

FIGS. 5 and 6 show an assembly fixture for a center wall 30 and a solid upper furniture part. The design and the arrangement of this fixture are similar to the species shown in FIGS. 1 to 4. However, the center wall is provided with two through-bores 11a in place of the blind-end bores 11 to mount a further adjusting plate 31 on the side of center wall 30 opposite to adjusting plate 9. The through-bores 11a are filled (see FIG. 6 at the right side) by pegs 34 of the separate adjusting plate 31. The adjusting plate 31 is fastened to the center wall 30 by means of the fastening screw 32. The horizontal and vertical furniture walls are assembled in the same manner as described above, i.e., screw driver 26 enters the slot 25 through a fitting aperture 33, and the worm eccentric is turned until the upper furniture part 3 rests securely at the top edge of the furniture center wall 30.

Figure 7:
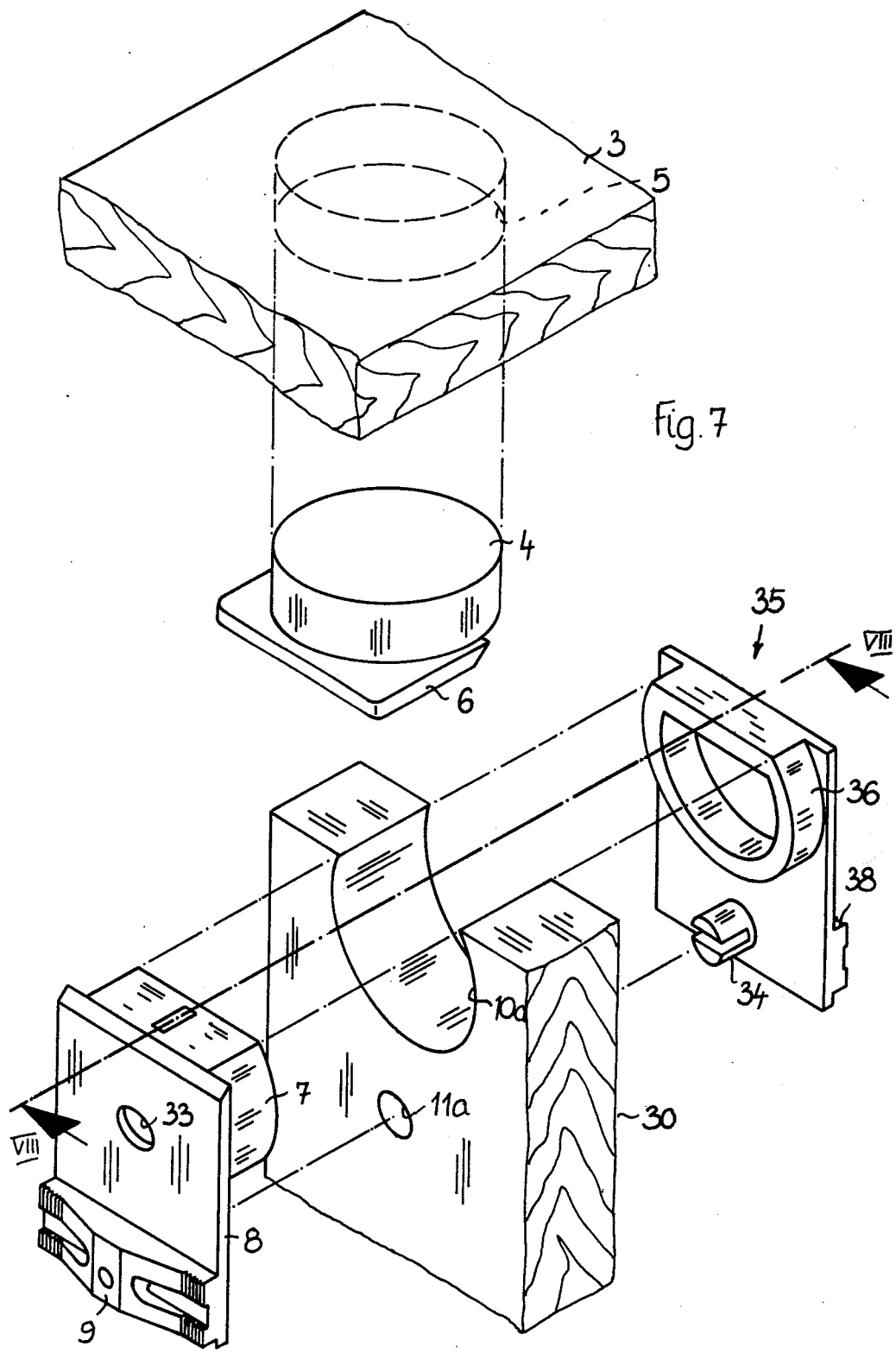
FIG. 7 is a perspective exploded view of a further embodiment of the assembly fixture for use at a center wall.
Figure 8:
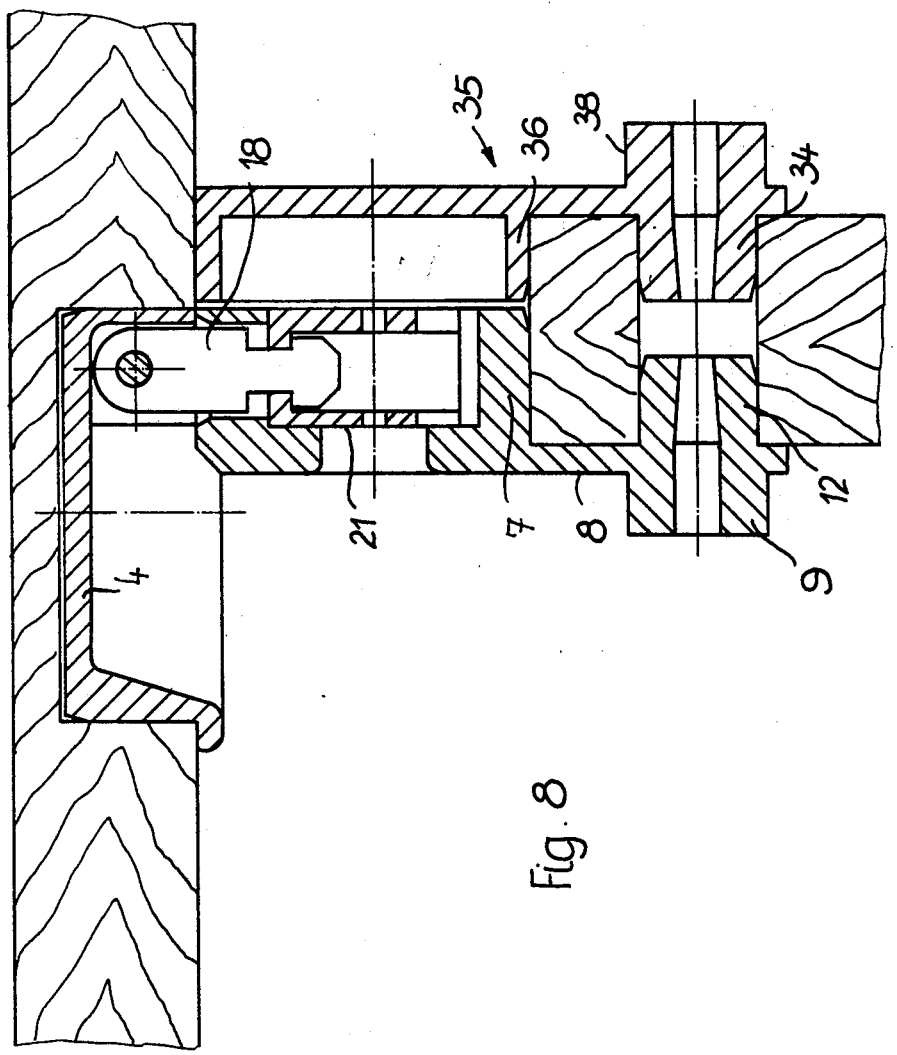
FIG. 8 is a sectional view through the fitted parts of FIG. 7 along line VIII—VIII of FIG. 7.

FIGS. 7 and 8 depict an assembly fixture which is closely similar to that illustrated in FIGS. 5 and 6. This species differs from the example shown in FIGS. 7 and 8 only by the presence of a through-going bore 10a for housing 7, and the use of a single through-bore 11a in place of two bores 11a. The through-going bores 10a and 11a are closed off by a cover plate 35 as best shown at the right side of FIG. 8. The cover plate 35 has a cup-shaped projection 36 that fits into the bore 10a and a peg 34 which enters bore 11a. Flange 8 has a peg 12 which engages the other end of bore 11a. The cover plate 35 carries an additional adjusting plate 38, operationally similar to the adjusting plate 9 but located on the opposite side of wall 30, for the hinge bracket 14 of hinge 13.

Figure 9:
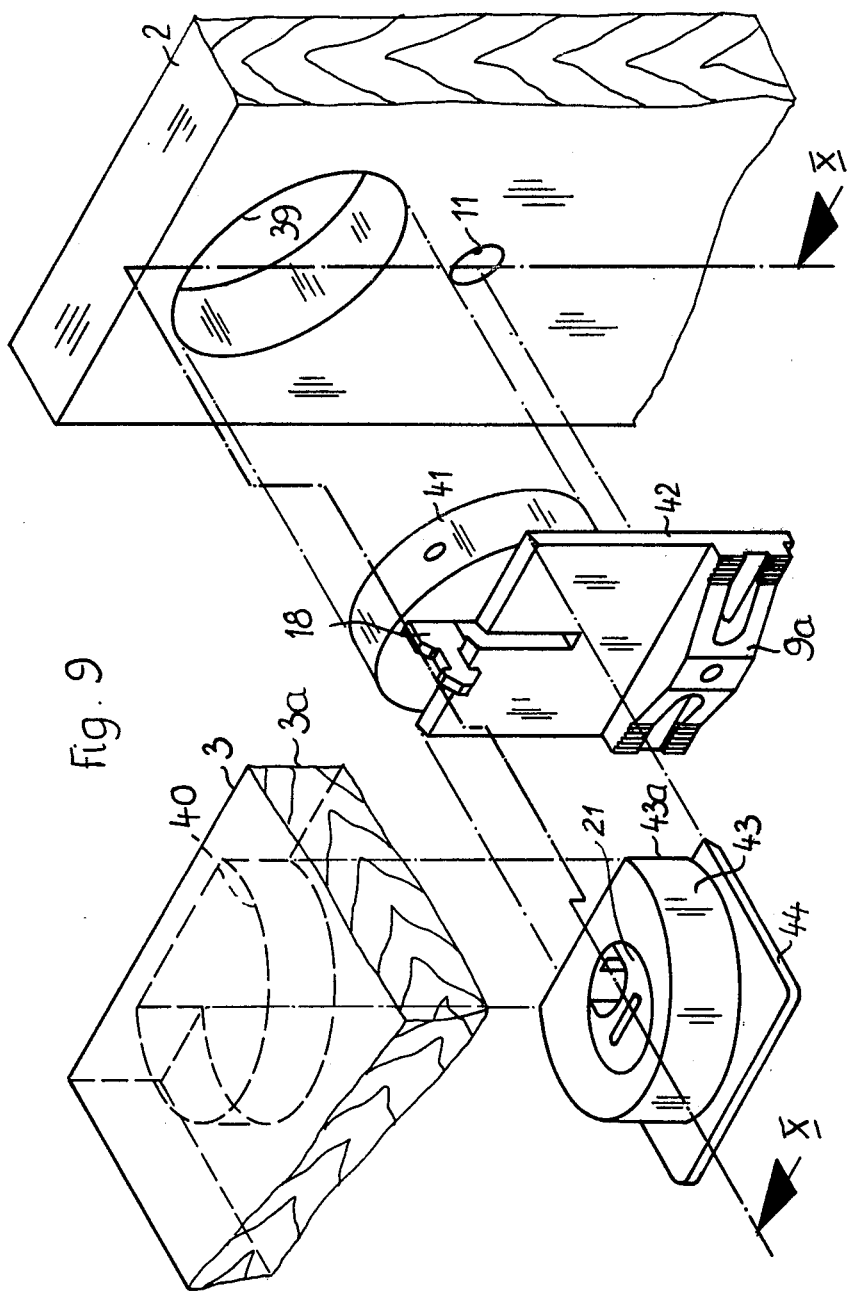
FIG. 9 is a perspective exploded view of still another species of the assembly fixture and an associated upper part and side wall.
Figure 10:
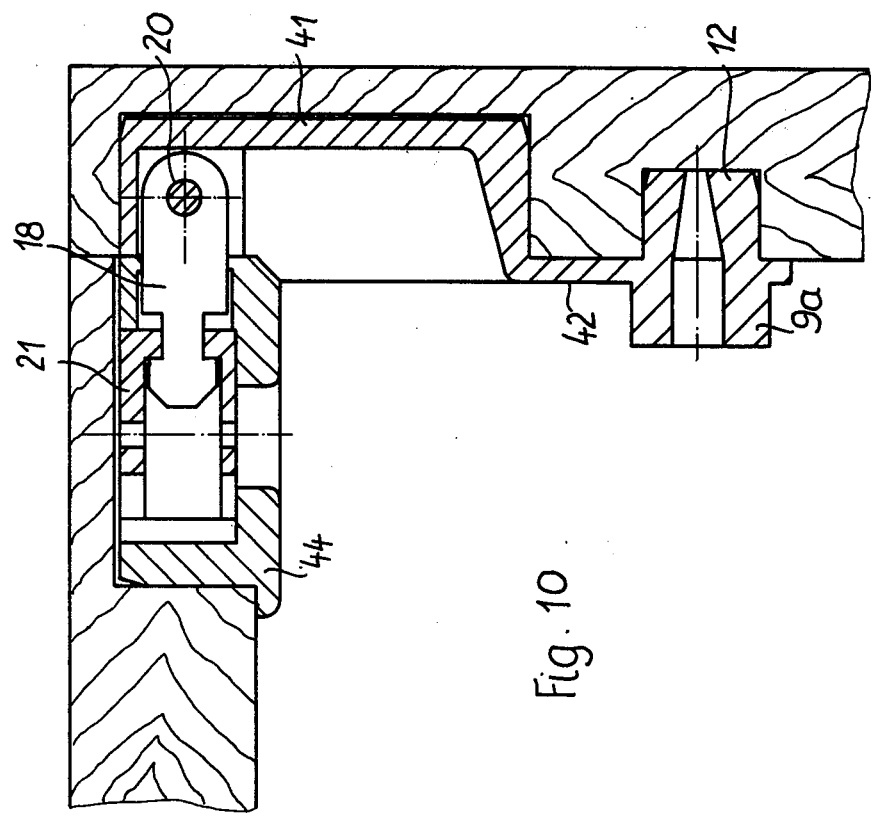
FIG. 10 is a sectional view along line X—X of FIG. 9.

FIGS. 9 and 10 show a species where the placement of the connecting rod 18 and the eccentric worm 21 are reversed and differ structurally from the examples shown in FIGS. 1 to 8. In this further embodiment, the connecting rod 18 is arranged in a casing 41. A flange 42 is formed onto the casing 41. The flange 42 supports the adjusting plate 9a in the form of a single-piece unit. The casing 41 is located in its assembled state within the bore 39 which is arranged in the furniture side wall 2. Within the upper furniture part 3, which pushes with its front edge 3a against the inside of the furniture side wall 2, there is provided a bore 40 to accommodate the casing 43. The casing 43 has a flattened area 43a which will align with the front edge 3a of the upper part 3 when fully installed.

Figure 11:
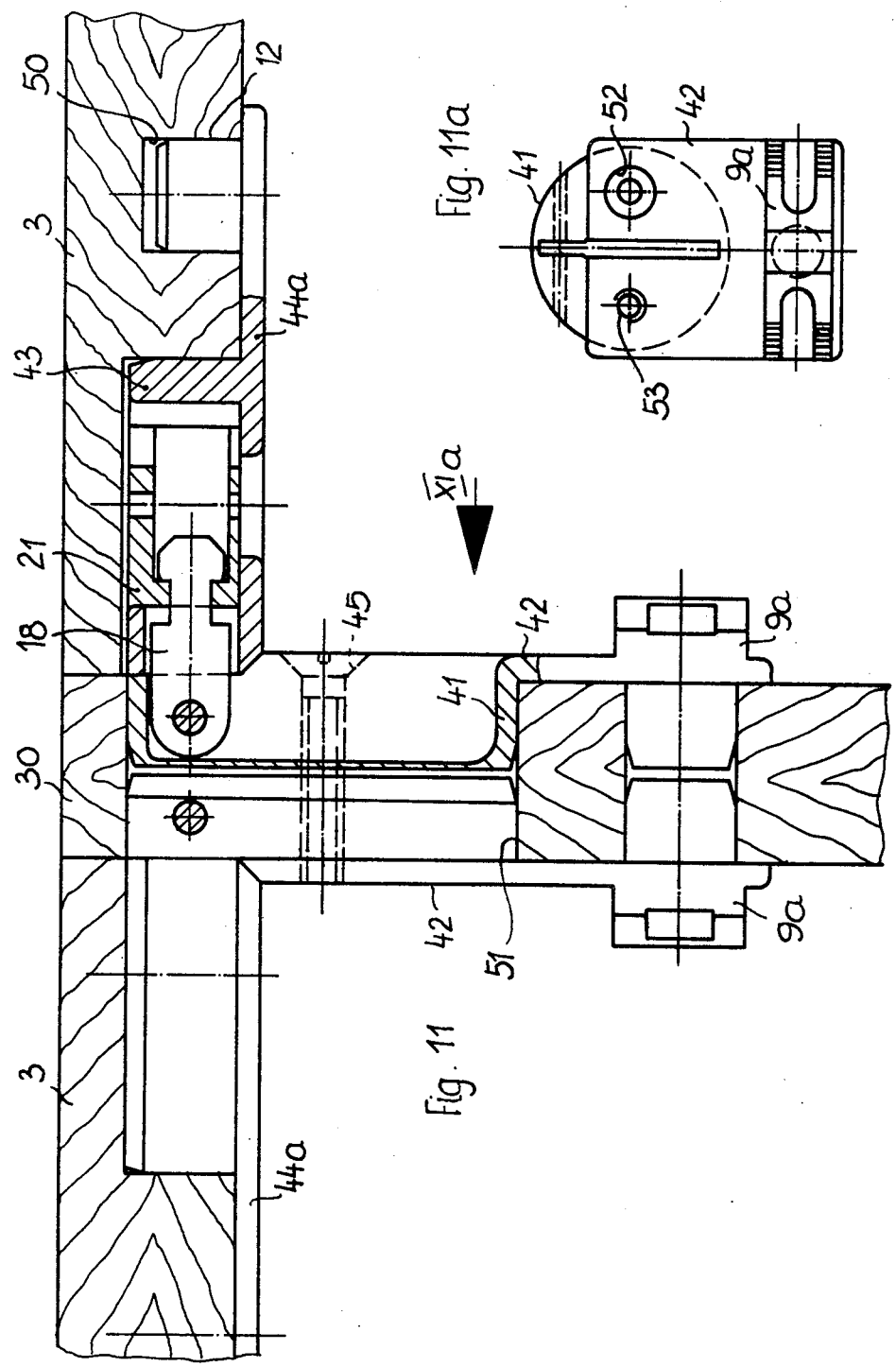
FIG. 11 is a longitudinal cross section of an assembly fixture in a center wall.

The species shown in FIGS. 11 and 11a differs from the example illustrated in FIGS. 9 and 10 mainly because the vertical wall shown in this further species is a center wall 30 which is joined on both sides to two upper furniture walls 3. Furthermore, the flange 44a, formed on the casing 43, is provided with one peg 12 which engages a blind-end bore 50 in one of the upper walls 3. The fastening of the casing 41 in the through-bore 51 is accomplished by two holding screws 45 which extend parallel to each other, one pointing with its head to the right, and the other with its head to the left. The casing 41 is equipped at its right side, as shown in FIG. 11a, with a countersunk bore 52 to accommodate the head of the holding screw 45 at the right, and at the left side with a thread 53 into which the left-side holding screw is screwed.

Figure 12:
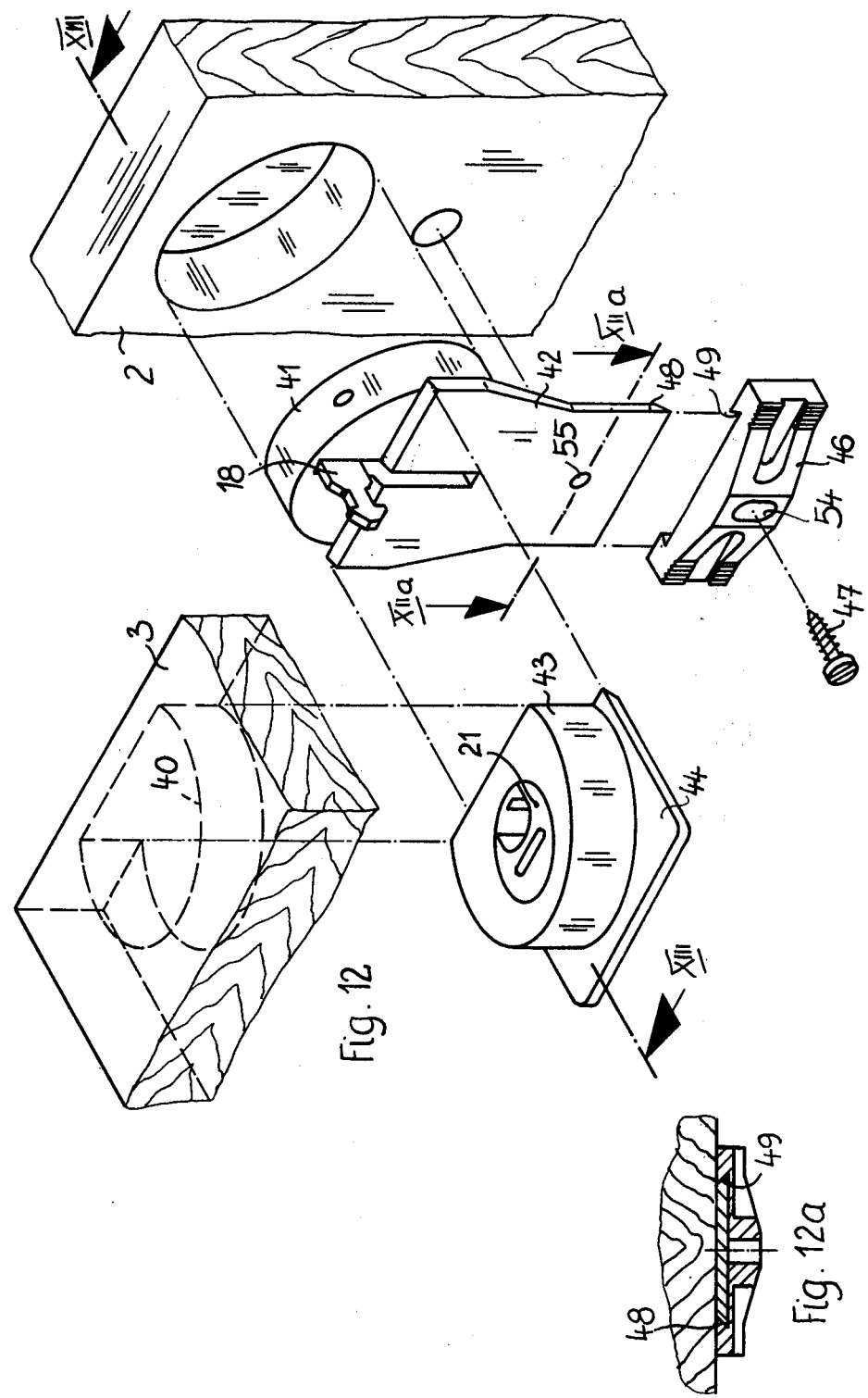
FIG. 12 is a perspective exploded view of the assembly fixture and of the furniture parts with a removable adjusting plate.
Figure 13:
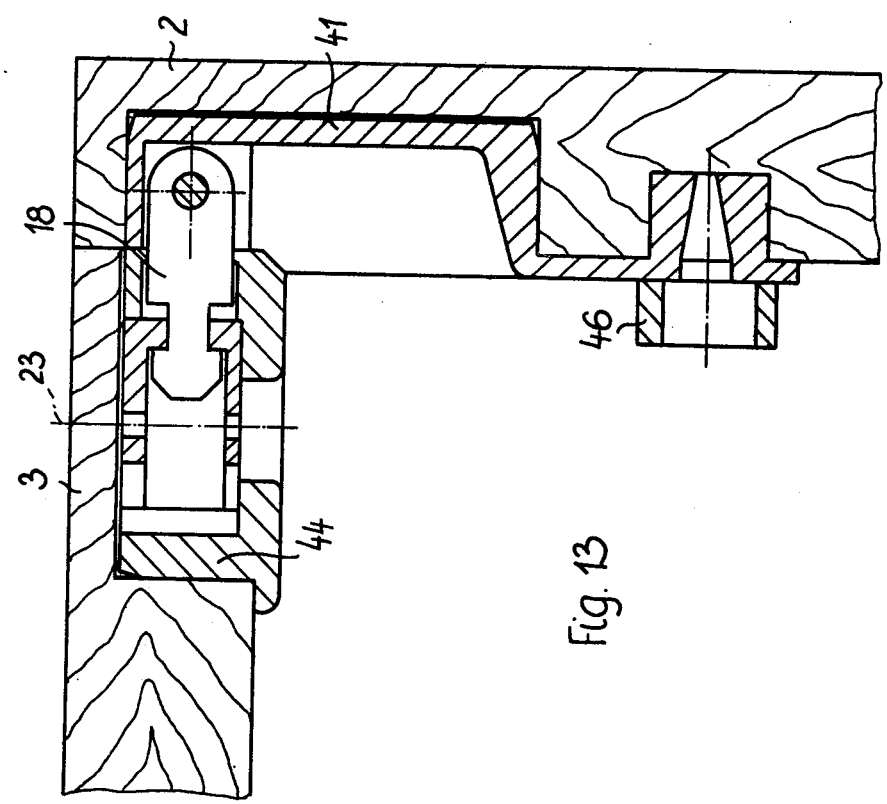
FIG. 13 is a sectional view along line XIII—XIII of FIG. 12 with the furniture parts in their fitted position.

The species shown in FIGS. 12, 12a and 13 is identical with the design shown in FIGS. 9 and 10, the only difference being that, in place of the integral adjusting plate 9a, an adjusting plate 46 is provided which can be separated from the flange 42. This separate adjusting plate 46 has a tapered slot 49 which forms a dovetail guide track that is locked by shape to the flange 42 by means of a conical edge 48 on said flange. A set screw 47 engages, through an oblong hole 54 in the adjusting plate 46, an aperture 55 in the flange 42. The oblong hole 54 is provided to allow a change in vertical position of the adjusting plate 46. In this manner it becomes possible to correct the height of the hinge bracket, and thus of the door.

Figure 14:
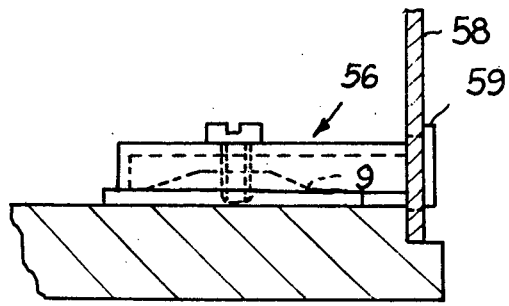
FIG. 14 is a side view of a rear wall bracket that is slid onto an adjusting plate in place of a hinge bracket.
Figure 15:
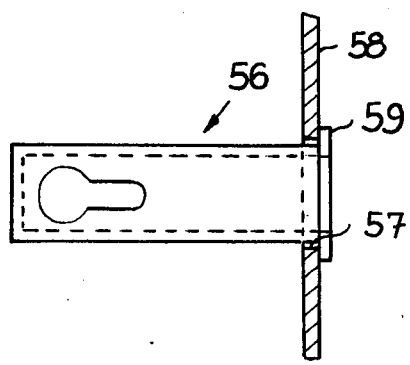
FIG. 15 is a plan view of the arrangement illustrated in FIG. 14.
Figure 16:
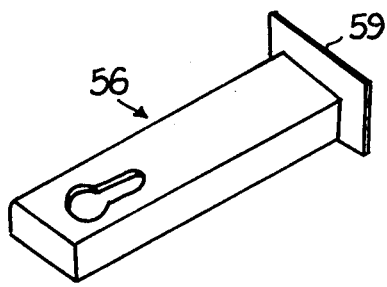
FIG. 16 is a perspective view of the bracket.

FIGS. 14 to 16 illustrate that it is also feasible to utilize, in place of the hinge bracket 14, a supporting bracket that is slid onto the adjusting plate 9 of an assembly fixture to hold in place a rear wall 58 of a piece of furniture. Such an arrangement is useful and advantageous in order to hold in place the rear wall 58 at the back portion of a piece of furniture where there are no doors that require fastening. The supporting bracket 56 has a U-shaped cross section and clasps the adjusting plate 9 in a manner similar to a hinge bracket. It passes through an aperture 57 of the rear wall 58 and holds the rear wall in place by means of its clips 59.

We claim:

1. In an assembly fixture for furniture of the type comprising a first fixture section containing a casing that can be embedded in an associated first furniture part, and a second fixture section adapted to be fastened to an associated second furniture part and arranged to cooperate with said first fixture section for attaching said first and second furniture parts to one another, said furniture including a door having a hinge attached thereto, said hinge having a pivotal hinge bracket adapted to be attached to said first furniture part for pivotally supporting said door from said first furniture part, the improvement wherein the casing of said first fixture section has a flange, said flange carrying an adjusting plate for longitudinally adjustable engagement with said pivotal hinge bracket of said hinge.

2. The improvement of claim 1 wherein said second fixture section is also provided with a casing that can be embedded in said associated second furniture part.

3. The improvement of claim 2 wherein one of said casings includes a swivel-mounted connecting rod arranged to disappear into a recess in said casing.

4. The improvement of claim 1 wherein said adjusting plate and said flange are separate elements which are complementarily shaped for separable engagement with one another.

5. The improvement of claim 1 wherein said flange carries a guide track for permitting said adjusting plate to be varied in position relative to said flange in a direction transverse to the direction of longitudinal adjustment between said adjusting plate and said hinge bracket.

6. The improvement of claim 5 wherein said guide track is formed as a dovetail guide track on said adjusting plate.

7. The improvement of claim 1 wherein said adjusting plate is integral with said flange.

8. The improvement of claim 1 wherein said hinge bracket is shaped to overlie said adjusting plate, said bracket having a projection for engagement with a selected one of plural abutments on said adjusting plate, and said bracket protruding outwardly through an aperture in said door from a pivot axis located closely adjacent said door.

9. The improvement of claim 8 wherein the cross section of said hinge bracket is "U"-shaped.

10. An assembly fixture for furniture of the type comprising first, second, and third furniture walls adapted to be connected to one another, said fixture comprising a first fixture section having a casing adapted to be embedded in the first furniture wall, a second fixture section adapted to be fastened to the second furniture wall and arranged to engage said first fixture section for attaching the first and second furniture walls to one another, said casing of said first fixture section including a flange having an elongated adjusting plate thereon, an elongated bracket adapted to be attached to the third furniture wall adjacent one end of said bracket with said elongated bracket extending outwardly from said third furniture wall in the direction of elongation of said adjusting plate, said elongated bracket being shaped and sized to overlie and cover said adjusting plate in longitudinally adjustable position relative to said adjusting plate, and fastener means for fixedly attaching said bracket in adjusting position to said adjusting bracket thereby to attach the third furniture wall to the first furniture wall.

11. The fixture of claim 10 wherein the third furniture wall is a door, said elongated bracket comprising a portion of a hinge adapted to be pivotally attached to said door adjacent said one end of said bracket.

12. The fixture of claim 10 wherein said adjusting plate is integral with said flange.

13. The fixture of claim 10 wherein said adjusting plate is separably attached to said flange.

14. The fixture of claim 10 wherein said adjusting plate includes a plurality of spaced serrations extending in a direction transverse to the direction of elongation of said plate, said bracket including a projection for engagement with a selected one of said serrations to adjust the longitudinal position of said bracket relative to said adjusting plate.

* * * * *